(12) United States Patent
Rojewski et al.

(10) Patent No.: US 8,706,586 B2
(45) Date of Patent: Apr. 22, 2014

(54) METHOD AND SYSTEM FOR IDENTIFYING SUBROGATION POTENTIAL AND VALUING A SUBROGATION FILE

(75) Inventors: Marcia Rojewski, Windsor, CT (US); Don Pierce, Enfield, CT (US); Alan Aleia, Glastonbury, CT (US); David Jeffrey, Cheshire, CT (US); Lisa Rojewski, Windsor, CT (US); Kim Rojewski, Westfield, MA (US); Chun-Chen Pai, Vernon, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 1297 days.

(21) Appl. No.: 11/888,931

(22) Filed: Aug. 3, 2007

(65) Prior Publication Data

US 2007/0288273 A1 Dec. 13, 2007

Related U.S. Application Data

(63) Continuation of application No. 09/676,391, filed on Sep. 29, 2000, now Pat. No. 7,343,308.

(60) Provisional application No. 60/207,246, filed on May 26, 2000.

(51) Int. Cl.
*G06Q 40/00* (2012.01)

(52) U.S. Cl.
USPC .............................................. 705/35; 705/38

(58) Field of Classification Search
USPC .......................................................... 705/35
See application file for complete search history.

(56) References Cited

U.S. PATENT DOCUMENTS

| | | | |
|---|---|---|---|
| 5,136,647 A | 8/1992 | Haber et al. | |
| RE34,954 E | 5/1995 | Haber et al. | |
| 5,557,515 A | 9/1996 | Abbruzzese et al. | |
| 5,875,431 A | 2/1999 | Heckman et al. | |
| 5,875,831 A | 3/1999 | Nohara et al. | |
| 5,956,687 A * | 9/1999 | Wamsley et al. | 705/1 |
| 5,991,733 A * | 11/1999 | Aleia et al. | 705/8 |
| 6,009,407 A | 12/1999 | Garg | |
| 6,687,708 B1 * | 2/2004 | Brobst et al. | 707/103 Y |
| 6,766,307 B1 | 7/2004 | Israel et al. | |
| 6,810,382 B1 | 10/2004 | Wamsley et al. | |
| 7,107,239 B2 * | 9/2006 | Graff | 705/36 R |
| 7,167,839 B1 * | 1/2007 | Layne | 705/40 |
| 7,191,150 B1 * | 3/2007 | Shao et al. | 705/38 |
| 7,392,201 B1 * | 6/2008 | Binns et al. | 705/4 |

(Continued)

OTHER PUBLICATIONS

Risk and Insurance, "Technology Unlocking the Neutral Network" by John Mutch; Jan. 1999.

(Continued)

*Primary Examiner* — Kirsten Apple
(74) *Attorney, Agent, or Firm* — Howard IP Law Group, PC

(57) ABSTRACT

A method for identifying select ones of insurance records which possess a favorable subrogation potential. The method includes receiving data indicative of a plurality of claims; automatically calculating a base score to identify select ones of the claims which demonstrate at least a given probability of expected subrogation recovery dependently upon the received data; automatically identifying risk factors for each of the select claims; and, automatically scoring each of the select claims dependently upon the base scores and identified risk factors to provide a value indicative of an expected subrogation recovery.

21 Claims, 3 Drawing Sheets

(56) References Cited

U.S. PATENT DOCUMENTS

| | | | |
|---|---|---|---|
| 7,624,031 B2* | 11/2009 | Simpson et al. | 705/4 |
| 2001/0005836 A1* | 6/2001 | Yang | 705/38 |
| 2002/0002475 A1* | 1/2002 | Freedman et al. | 705/4 |
| 2002/0035488 A1 | 3/2002 | Aquila et al. | |
| 2002/0059139 A1* | 5/2002 | Evans | 705/40 |
| 2005/0086180 A1 | 4/2005 | Wamsley et al. | |
| 2007/0043659 A1* | 2/2007 | Kass et al. | 705/38 |
| 2007/0288272 A1* | 12/2007 | Marks et al. | 705/4 |

OTHER PUBLICATIONS

High-tech sleuths; Leslie Westein Hann, Best Review ( Property/Casualty Insurance Edition) Oldwick: Nov. 1998, vol. 99, Iss 7; p. 83, 3 pgs.

John Mutch, "Technology: Unlocking the Neural Network", Risk & Insurance, Jan. 1999.

Leslie Westein Hann, "High-tech Sleuths", Best Review (Property/Casualty insurance edition), Oldwick: Nov. 1998; 99: 7, p. 83-85.

* cited by examiner

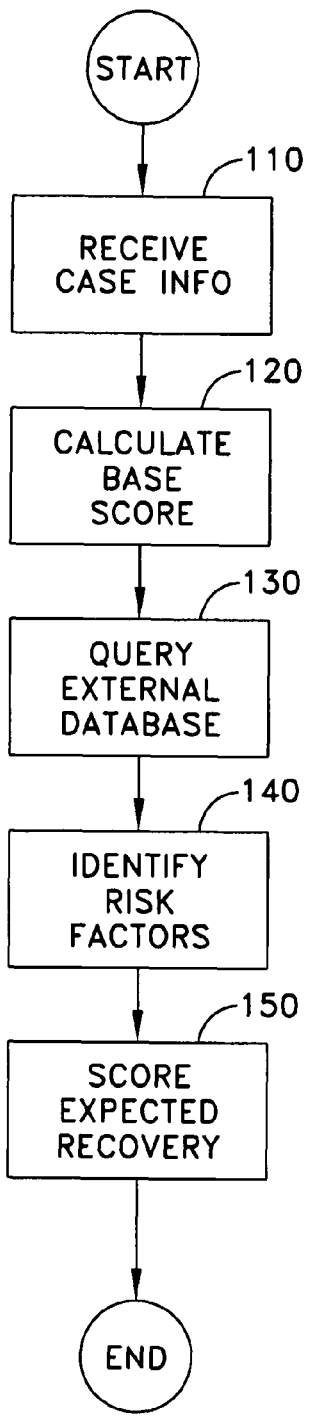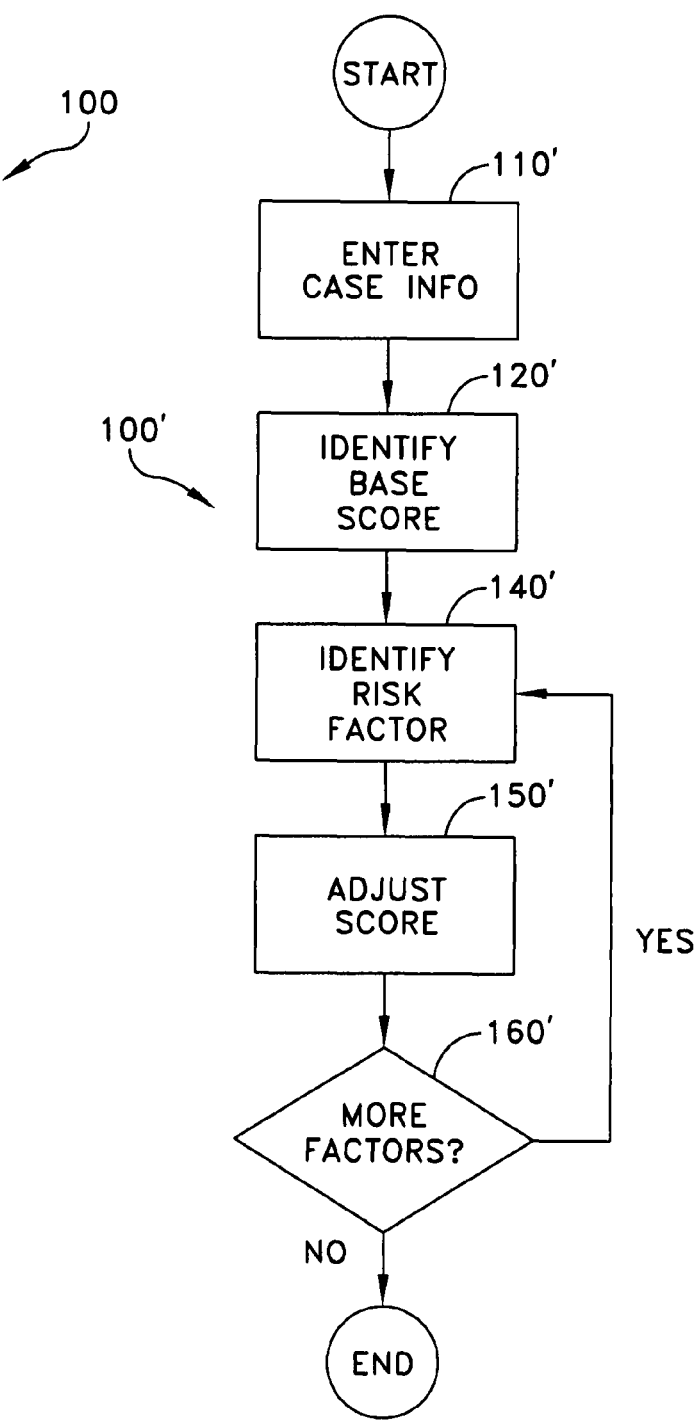
FIG. 1
FIG. 2

METHOD AND SYSTEM FOR IDENTIFYING SUBROGATION POTENTIAL AND VALUING A SUBROGATION FILE

RELATED APPLICATION

This application is a continuation of U.S. patent application Ser. No. 09/676,391, filed Sep. 29, 2000, now U.S. Pat. No. 7,343,308, which in turn claims priority benefit of and is related to commonly assigned and copending U.S. Patent application Ser. No. 60/207,246, entitled "ONLINE METHOD AND SYSTEM FOR FULFILLING NEEDS RESULTING FROM PROPERTY AND OTHER SIMILAR LOSSES" filed May 26, 2000, all of which are hereby incorporated by reference in their entireties for all purposes.

FIELD OF THE INVENTION

The present invention relates generally to subrogation and more particularly to methods and systems for identifying subrogation potential and subrogation file valuing.

BACKGROUND OF THE INVENTION

Generally, subrogation refers to an insurer's right to recover losses paid under insurance contracts from parties legally liable for the damages. A problem often encountered is that an insurer or entity that is designated to recover the loss can incur significant costs in assessing the collect-ability of the claimed recovery. Insurers also bear the financial and fiduciary risk of failing to recognize that specific claims may have subrogation recovery potential.

In the insurance industry as well as other financial institutions such as banking, scoring has long been an integral part of underwriting operations. This is largely made possible because of product standardization and buyer homogeneity.

To reduce costs, it has been found desirable to provide an expert rating, or scoring method which identifies subrogation potential early on in a claims handling process, and serves as a predictor of recoverability in order to improve collection efficiencies. It is a further object of the present invention to enable pooling or packaging of claims into portfolios for eventual sale of the subrogation rights on the underlying claims to entities that specialize in such collection activities, for example.

SUMMARY OF THE INVENTION

A method for identifying select ones of insurance records which possess a favorable subrogation potential, the method including: receiving data indicative of a plurality of claims; automatically calculating a base score to identify select ones of the claims which demonstrate at least a given probability of expected subrogation recovery dependently upon the received data; automatically identifying risk factors for each of the select claims; and, automatically scoring each of the select claims dependently upon the base scores and identified risk factors to provide a value indicative of an expected subrogation recovery.

BRIEF DESCRIPTION OF THE FIGURES

Various other objects, features and advantages of the invention will become more apparent by reading the following detailed description in conjunction with the drawings, which are shown by way of example only, wherein:

FIG. 1 illustrates a block diagram of a first method for practicing the present invention;

FIG. 2 illustrates a block diagram of a second method for practicing the present invention;

DETAILED DESCRIPTION OF THE INVENTION

Subrogation identification refers to a method for recognizing if a claim file has subrogation potential or might be found to have potential after further investigation Subrogation scoring refers to a method for valuing a subrogation file. The score provides a measure of the collectability of a subrogation claim. Once a score of collectability is determined, a monetary value can be associated with it. This enables the subrogation rights on groups of claims to be bundled into a marketable "security". These securities may then be sold to entities possessing collection capabilities, for example.

In other words, the existence of a centralized collection of claims would allow subrogation claims files to be created. Once the value of such files are established, a market for the sale of their subrogation rights may be established. Essentially an exchange of marketable subrogation claims could be created. In a business-to-business (B2B) exchange, sellers, market makers and investors can transact for wholesale claims, pre- and post-accident purchase and sale of traunches of risk obligations and subrogation rights.

The present system and method preferably automatically scores a claim to determine a likelihood of subrogation potential, and then, the value of the claim recovery. A checklist is provided for the recovery specialist to follow to standardize operations and maximize recoveries. The subrogation opportunity is valued by reviewing criteria such as accident description, loss state, responsible party, and other pertinent demographics. Once the system and method assigns a subrogation identification rating, a score and valuation, the claims with definite subrogation potential are bundled or pooled with other claims that have some commonality to the newest claim. Thereafter, the bundled set or portfolio is valued as to its sale price. As a central market for wholesale claim service and financial liquidity, the invention can utilize network economics to further reduce claim handling costs to its participating insurance companies, while building an electronic database about claims handling.

Figure 3:
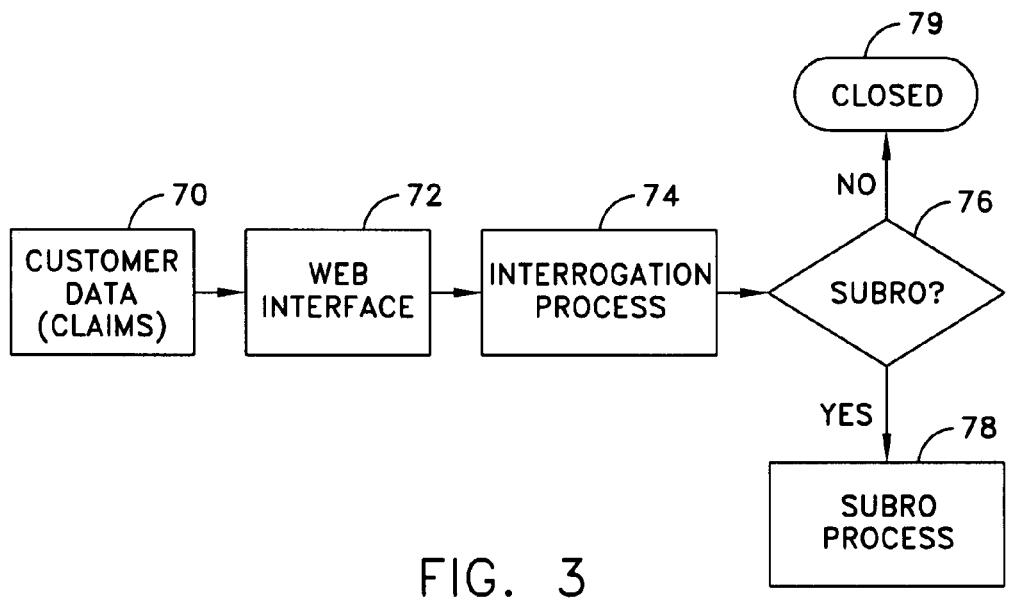
FIG. 3 is a block diagram, which illustrates how subrogation opportunities are identified according to the invention.
Figure 4:
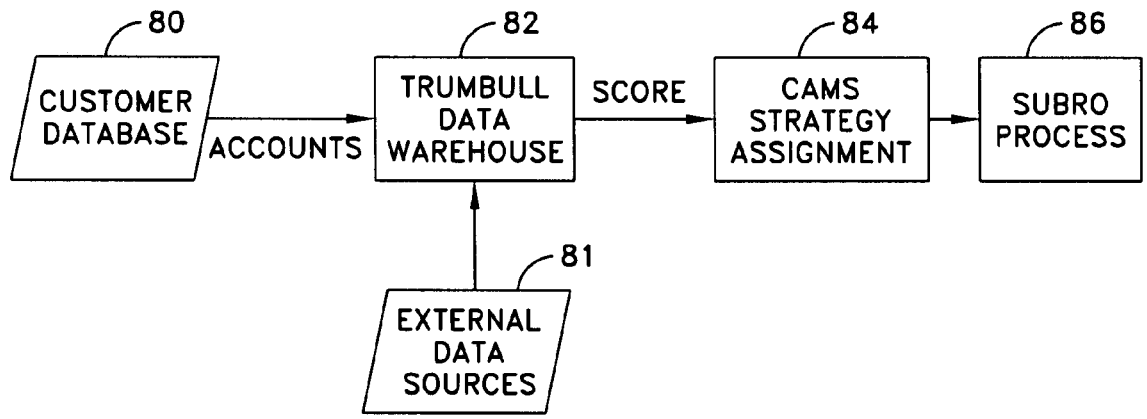
FIG. 4 is a block diagram, which illustrates the use of the data warehouse in subrogation scoring according to the invention.

Referring now to FIG. 3, in one embodiment of the present invention subrogation opportunities are identified using claim data 70 obtained via a web site 72 during an interview or interrogation process 74, for example. The claim data is analyzed 76 for state, type of claim, accident description, loss date, claim notes, presence of a favorable police report, existence of an insurance carrier, and other similar criteria. As subrogation opportunities are identified 78, the claimant's file is passed to the subrogation process for servicing. If no subrogation opportunity is found, the file is closed 79.

Factor values are derived from an assessment of similar historical claims recoveries. Using these factors, a probability of recovery is calculated. The factors and weights potentially vary by customer. The system assigns a strategy and checklist for working the account based on the score resulting from the calculated probability of recovery as well as on the type and circumstances of the claim. The scoring is then applied to a grouping of claims/accounts to determine the aggregate value of the group. The value of the group is used in a subrogation claim exchange process 86.

Figure 5:
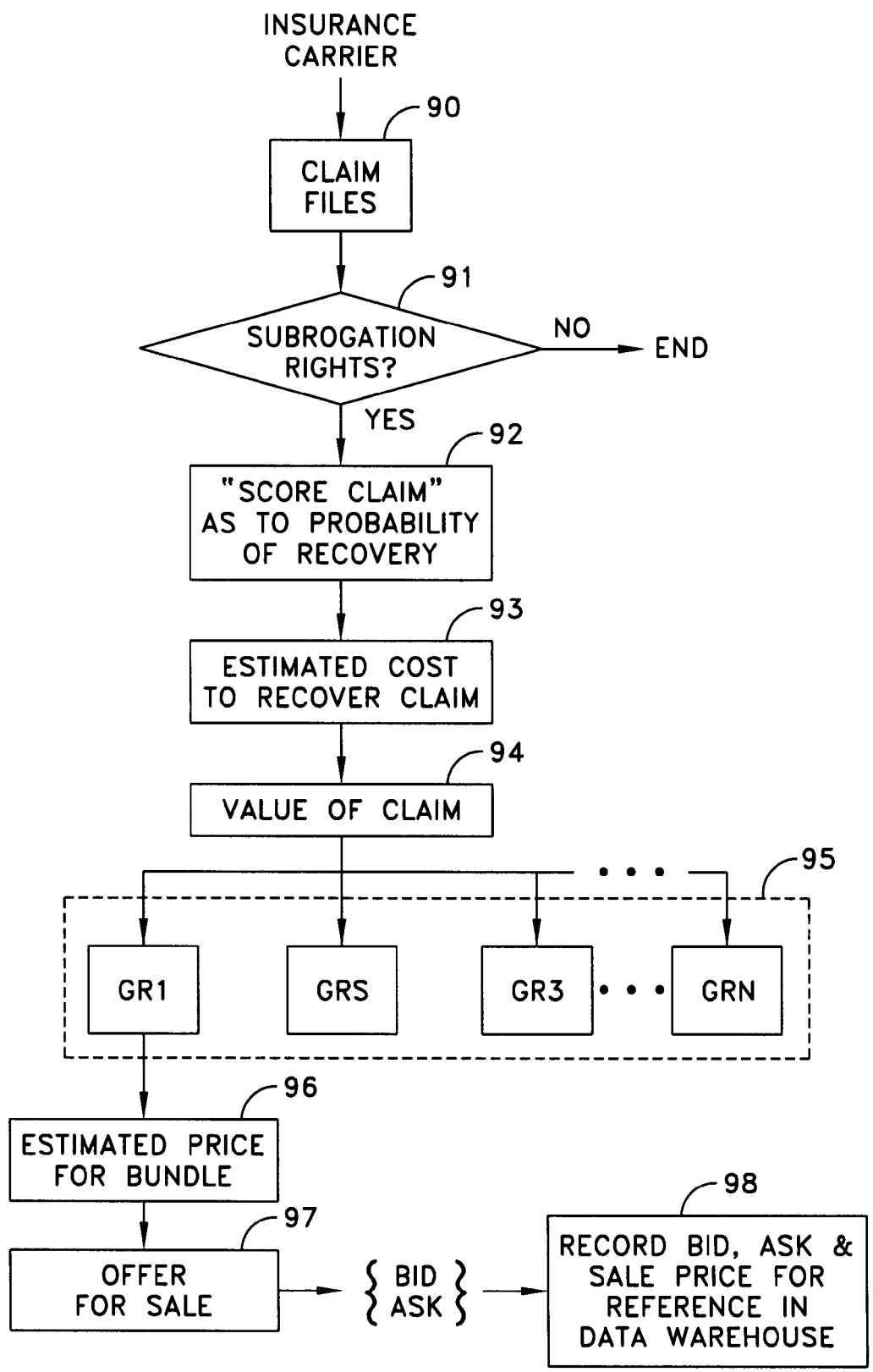
FIG. 5 is a block diagram, which illustrates how the invention compiles, values and sells subrogation rights.

FIG. 5 illustrates how the invention compiles, values and sells subrogation rights. Claims files 90 stored in the data warehouse 82 are searched to identify 91 claims with subrogation rights and potential. A claim with subrogation potential is scored 92 as to the probability of its recovery, and the cost of recovering the claim is estimated 93. The recovery score and the estimated timing and costs of recovery assessment are used to set a value 94 for the claim. Once the claim is valued, it is bundled or pooled 95 into a group with other claims that have some commonality to the claim. In particular, the claims are grouped according to pre-established criteria, examples of which include but are not limited to dollar value, type of claims (automobile, homeowners) state or region. The bundled group or portfolio of claims is then valued 96 as to its sale price and risk potential and offered for sale 97 in an auction-like manner. The bid, ask and sale prices are then recorded 98 in the data warehouse.

Referring again to the subrogation scoring 92, it predicts the potential for claim loss and deductible recoverability. Insurers and subrogation collection agencies can use this score to optimize collection strategies and staffing levels, price assignments of subrogation rights and set netback: guarantee rates for example.

A subrogation score can be used to set up strategies for contingent collection services, further reducing internal costs. It can be used to establish manpower needs, set goals, and measure collector efficiencies. In an environment where the subrogation rights are grouped into categories based upon multiple criteria, one of which is a valuation based upon a subrogation score, these groups or portfolios can be offered for sale. In this case the score would be integral to pricing the portfolio and evaluating risk.

Three types of subrogation scores that predict these recoveries, including or excluding collection expense utilized according to a preferred form of the present invention are: COLLECTION SCORE, NET BACK SCORE and NET LIQUIDATION SCORE. All scores reflect predictions of subrogation recoveries for individual claims. All scores are derived from algorithms factoring in characteristics of: underlying insurance, the underlying insurance claim, legally liable party (tortfeasor), the tortfeasor's insurance carrier, the current economic environment, and collection operations, for example.

The COLLECTION SCORE focuses on the expected ultimate loss recovery. The NETBACK SCORE is a composite scoring valuing recoveries net of collection expense. The NET LIQUIDATION SCORE is a more sophisticated version of the NETBACK SCORE. Values reflect the net present value of ultimate losses recovered and costs expensed. It should be recognized that this is reflective of a future market in subrogation portfolio sales.

Basically, the NETBACK SCORE=LIQUIDATION SCORE−EXPENSE SCORE. The LIQUIDATION SCORE component expands the COLLECTION SCORE to incorporate the element of time. A set of LIQUIDATION SCORES is created reflecting rates of recoveries at 12, 15, 18, or 24 months as well as at ultimate, for example. The EXPENSE SCORE factors in unit cost estimates based on operational strategies. These can be generalized for common consumption or customized for specific:buyers.

Referring now to FIG. 1., therein is illustrated a preferred form of the present invention 100, wherein data for a claim is received through one of several methods such as extraction from a web-based interface at the point of loss entry, file transfer of batch of claims closed during a target period, or batch of claims just placed for subrogation collection 110. A base score, or COLLECTION SCORE, is calculated 120, a set of external databases is queried for additional data relating to the claim, such as the legally liable party or the party's insurance carriers 130, risk factors are identified 140 and a final score, or value, indicative of the expected recovery is provided 150.

According to a preferred form, the COLLECTION SCORE, related to the expected recovery, rate is first calculated for each claim by: (1) calculating an expected probability a legally liable party will make a payment; (2) calculating an expected probable percentage of losses recovered through payments received from legally liable parties; (3) adjusting resultant scores for differences due to economic conditions or operation strategies or efficiencies; and, (4) identifying specific risk factors associated with the individual claims and adjusting the resultant score accordingly.

Next, the NETBACK SCORE is calculated for each of the claims by: (1) calculating the LIQUIDATION SCORE at specific periods of time; and, (2) calculating the EXPENSE SCORE for each of the specified periods of time. Next, the NET LIQUIDATION SCORE is calculated by analogously.

Referring now also to FIG. 2, therein is illustrated an alternative method equally applicable to the present invention, wherein like elements or steps to those of FIG. 1 are designated with a ' symbol. Basically, data for a claim is received 110', a base score, or COLLECTION SCORE, is calculated 120' by querying an external database for example, a risk factor is identified 140' and a final score, or value, indicative of the expected recovery is provided 150'. If more risk factors remain to be considered, steps 140' and 150' are repeated 160'.

The present invention's method of subrogation collection scoring focuses on the expected ultimate loss recoverability, as well as the collection timeframe. Referring now more particularly to variables considered which are used to derive these scores using appropriate algorithms, for the underlying insurance, characteristic variables used preferably include: whether the claim arises from a preferred, standard, non-standard or affinity policy group; whether a personal or commercial lines policy is involved; and, whether the responsible party has insurance as well as if both first and third party insurers are members of a common alternative dispute resolution organization.

Variables associated with the underlying insurance claim preferably include: the number of subrogation collection agencies who have previously worked the account; the type of underlying claim; the size of the claim; the length of time since loss occurrence when the present collection effort is initiated; the negligence laws associated with the state of legal jurisdiction; the relative degree of insured's and tortfeasor's negligence; whether legal action was initiated under statute of limitation or whether there was some extension of statute of limitations; and, whether there exists any type of legal judgments rendered.

The variables used associated with the legally liable party (tortfeasor) preferably include: for uninsured and underinsured individuals or groups of individuals-income levels; homeownership; gender; presence of children; number of years at current residence; age; and, marital status. For uninsured businesses, variables used preferably include: bankruptcy; existence of liens; judgments; derogatory legal information; problems in paying suppliers; number of employees (size of business); other financial strength indicators; length of time in business; business structure (incorporated, "doing business as", LLC); and type of business. For other uninsured parties, the variables preferably used include: whether the party is a nonprofit agency; fraternal in nature; or, a type of government agency.

For the tortfeasor's insurer, variables used preferably include: financial strength; resistance to pay characteristics; common membership in alternative resolution pools; and, the type of insurance business.

For the current economic environment characteristic, variables used preferably include: inflation; interest rates and tight money conditions; unemployment and bankruptcy levels; financial strength of legally liable party's industry and geographic region; and generalized or unique subrogation operation expense and effectiveness assumptions.

Scores preferably range from 0 to 1,000. The higher the score, the greater the probable recovery. A score of 1,000 indicates a probable full recovery, while a score of 0 is given when no recovery is expected.

To develop the scores, first each subrogation claim $X_I$ is encoded to describe characteristics of:

1. the claim, legally liable party and tortfeasor's insurer I, where:

$X_I \in \{I(ij)|$ attribute $j=1, \ldots, k$ for characteristic $i=1,2, \ldots 1\}$ $Y_I \in \{I(ij)|$ risk factor $m=1, \ldots, z$ associated with the specific debt$\}$ 2. the current economic environment A, $A \in \{a_1, a_2, a_3, \ldots, a_n\}$ 3. and, the collection strategies B, $B \in \{b_1, b_2, b_3, \ldots, b_n\}$ Scores are then calculated using expected values associated with the encoding in the baseline subrogation operation and in the economic environment. More specifically, For every Claim $X_{IAB}$, The SUBROGATION COLLECTION SCORE $(X_{IAB}, _{YI})=10,000$ $E(P_I R_I N_{IA} O_{IB})\Pi Y_{Im}$, for $m=1, \ldots, z$ SCORE $\in [0, \ldots, 10,000]$, where $P_I$=probability of a legally liable party with characteristics I making any payment;

$R_I$=probable percentage of losses recovered from parties who make any payment;

$N_{IA}$=adjustment reflecting the difference in expected recoveries from base expectations under economic scenario A;

$O_{IA}$=adjustment reflecting the difference in expected recoveries from base expectations under operational scenario B; and, $Y_{IM}$=risk factors associated with characteristics of the claim Factors vary by type of claim. Looking at each in turn.

$P_1$: The dominant general model for the Probability of a Legally Liable Party with Characteristics I Making Any Payment is in the form:

$$P_I = \alpha_{0I} + \alpha_{1I}[e\phi/(1+e\phi)]$$

$$\phi = 1n(p_{ij}) = \sigma_{0ij}\sigma_{1ij}(0,1) + \sigma_{2ij}(0,1) + \ldots \sigma_{kij}(0,1)$$

for $X_I \in \{I(ij)|$ attribute $j=1, \ldots, k$ for characteristic $i=1,2, \ldots 1\}$ Predictive parameters are estimated based on an assessment of historic recovery patterns using: (1) a combination of parametric and nonparametric statistical techniques including but not limited to binomial estimation, binomial regression, general loglinear, and logit loglinear analysis, and Ordinal Regression, and, (2) heuristics. In all cases, the resultant $P_I \in (0,1]$ $R_I$: The dominant form for the Percentage of Loss Collected when payments are made is a piece-wise defined function. This is because the predominant recovery is 100%.

Parameters are developed from an assessment of historic recovery patterns using: (1) a combination of parametric and nonparametric statistical techniques including but not limited to: general loglinear, and logit loglinear analysis, and Ordinal Regression, (2) age-to-age analysis trends, and (3) heuristics in all cases: $R_I \in (0,1]$ $N_{IA}$ Economic Scenarios reflect, but are not limited to, characteristics such as: (1) Unemployment and bankruptcy rates, (2) Interest rates and tight money conditions, (3) Financial strength of legally liable party's geographic area and industry, (4) Inflation, and (5) Leading economic indicators. The dominant form is $[1+E(v_{Ia})]$ for $a=1, \ldots, n$. where, $v_{Ia}$ is a binomial distribution$\cong N(0,1)$. Factors are developed using monte carlo simulation techniques, based on heuristics and/or statistical observations of payor and liquidation patterns.

$O_{IB}$ Operational Scenarios reflect, but are not limited to, characteristics such as: (1) Type and amount of prior collection efforts, (2) Quality of subrogation screening, investigation and documentation conducted during settlement of underlying claim, (3) Thresholds for attorney involvement, filing of law suits and use of alternative dispute resolutions mechanisms, (4) Settlement authority and strategies, and (5) Positions on skip tracing and additional investigation efforts. The dominant form is $[1+E(O_{Ib})]$ for $b=1, \ldots, n$. where, $O_{Ib}$ is a binomial distribution$\cong N(0,1)$. Factors are developed using monte carlo simulation techniques, based on heuristics and/or statistical observations of payor and liquidation patterns.

$Y_{IM}$=Risk Factors reflect, but are not limited to, characteristics such as: (1) Limitations of legal process due to statutes of limitations, (2) Degree of Insured's and tortfeasor's legal culpability in specific claim, (3) Reduced collection potential evidenced by failure of other collection agencies to recover on claim, and (5) Limitations due to difficulty in identifying and/or locating tortfeasor. The dominant form is $[1+E(\omega_{Im})]$ for $m=1, \ldots, z$. where, $\omega_{Im}$ is a binomial distribution$\cong N(0,1)$. Factors are developed using monte carlo simulation techniques, based on heuristics and/or statistical observations of payor and liquidation patterns.

Validation of the mathematical models is done in several steps. The first goodness-of-fit criteria to be met is a demonstrated unbiased pattern of Chi-square residuals made against the original fitted data. This is followed by differing levels of stochastic-based retrospective testing as well as simulated user tests.

The NET BACK SCORE is a composite score incorporating the cost of collection into the predictions. It reflects the estimated relative expected loss recoveries net of expense (netback). Options are to do so at the end of 12, 15, 18, or 24 months in the future or to do so at ultimate. As set forth, NET BACK SCORE=LIQUIDATION SCORE—EXPENSE SCORES, all at time t. The LIQUIDATION and SUBROGATION COLLECTION SCORES are sisters. They differ only in the predictive timeframe. When the LIQUIDATION SCORE is calculated at ultimate, the scores are twins.

The EXPENSE SCORE reflects either unit costs for specific types of activities or general expense loads. It is based on either specific or generalized operational strategies.

Like the COLLECTION SCORE, NET BACKS SCORES are derived from algorithms factoring in characteristics of the underlying insurance claim, legally liable party, tortfeasor's insurer and the current economic environment.

Costs can reflect those of a standard subrogation facility or one using customized operational strategies.

In one embodiment of the present invention, scores range from −10,000 to +10,000. The higher the score, the greater the probable recovery. A score of 10,000 indicates probable full recovery at no material expense. A score of 0 is given when collection costs are equal to recoveries. A score of −10,000 reflects expected expenses at least twice exceed expected recoveries.

As set forth, to develop the scores, first each subrogation claim $X_I$ is encoded to describe characteristics of the claim, legally liable party, and tortfeasor's insurer I, where $X_I=\{I(ij)|j$ refers to attribute 1, . . . , k for each characteristic i=1,2, . . . . }

$Y_I=\{I(i,j)|$ risk factor m=1, . . . , z associated with the specific debt}, the current economic environment A, A={$a_1$, $a_2$, $a_3$, . . . , $a_n$}collection strategies B. B={$b_1$, $b_2$, $b_3$, . . . , $b_n$}unit cost factors C, C={$c_1$, $c_2$, $c_3$, . . . $C_n$}

A score set is then developed for time T, where T={t1=12 months, t2=15 months, t3=18 months, t4=24 months, t5=at ultimate}. Each NETBACK SCORE set is calculated using expected values associated with the encoding over the range of time t. For Claim. $X_{IAB}$, and t=1, 2, 3, 4, 5, SUBROGATION NETBACK SCORE $(X_{IABt}, Y_I)$=LIQUIDATION SCORE $(X_{IABt}, Y_I)$−EXPENSE SCORE $(X_{IABt})$. LIQUIDATION SCORE $(X_{IABt}, Y_I)$=10,000 $E(P_{It} R_{It} N_{IAt} O_{IBt})$ for m=, . . . , z, limited to be in [10.0000, . . . 10,000].

Calculating the LIQUIDATION SCORE is otherwise identical to the SUBROGATION COLLECTION SCORE. The LIQUIDATION SCORE is based on evaluation of recoveries over the range of time t; the SUBROGATION SCORE, at ultimate.

The EXPENSE SCORE, however is unique. EXPENSE SCORE $(X_{IABt})$=10,000 $E(U_{IBt} O_{IBt})$, where $U_{IBt}$=Unit Cost of Collection Activity under Operational Scenario B through time t. $Q_{IBt}$=Adjustment Reflecting the Difference in Expected Costs Under Operational Scenario B, From the Baseline. Looking at the mathematical factors in turn, $U_{IBt}$ Unit Costs under Operational Scenarios B reflect but are not limited to, characteristics such as: (1) (Cost of phone calls)×(Expected Number of calls to be made), (2) (Cost of letters mailed)×(Expected Number of letters to be sent), (3) (Cost of additional investigation, legal documentation expense, and skip tracing)×(probability this will be necessary), and, (4) (Costs of legal action over the spectrum of legal actions possible)×(probability this will be necessary). The dominant form is $[1+E(\chi_{Im})]$ for c=1, . . . , n, where, $\chi_{Im}$ is a binomial distribution≅N(0,1). Factors are developed using monte carlo simulation techniques, based on heuristics and/or statistical observations.

$Q_{IBt}$ These factors calibrate the scores to reflect operational costs appropriate for the target claims. The dominant form is $[1+E(\chi Im)]$ for c=1, . . . , n. Factors will be provided by the operational managers in the form of absolute or point estimates.

The validation process is identical to that of the Subrogation Collection Scores.

The NET LIQUIDATION SCORE is a more sophisticated version of the NET BACK SCORE. Values reflect the net present value of both the recoveries and expenses, based on prevalent interest rates. This score is useful for subrogation portfolio purchases.

At an interest rate of 0, the NET LIQUIDATION SCORE and NET BACK SCORE at time ultimate are identical. The mathematics differ only in application of a present value factor to all components. Validation procedures are identical.

Table-1 summarizes the foregoing as a chart of attributes and risk factors:

TABLE 1

| Attributes | Risk Factors | |
|---|---|---|
| X | | underlying insurance |
| | X | preferred/standard nonstandard/affinity group |
| | X | personal/commercial lines |
| | X | membership of first and third party insurers in common alternative dispute resolution organizations underlying insurance claim |
| | X | number of collection agencies who have previously worked the account |
| X | | type of underlying claim |
| X | | size of claim |
| X | | length of time since loss occurrence when this collection effort is initiated |
| X | | negligence laws associated with the state of legal jurisdiction |
| | X | relative degree of insured's and tortfeasor's negligence |
| | X | whether legal action was initiated under statute of limitation or whether there was some extension of statute of limitations |
| | X | existence and type of legal judgments rendered |
| X | | legally liable party (tortfeasor) |
| | X | Type of information available to identify and locate responsible party |
| X | | for uninsured/underinsured individual or group of individuals |
| X | | income levels |
| X | | homeownership |
| X | | gender |
| X | | presence of children |
| X | | number of years at current residence |
| X | | age |
| X | | marital status |
| X | | for uninsured businesses |
| X | | bankruptcy |
| X | | existence of liens, judgments, derogatory legal information |
| X | | problems in paying suppliers |
| X | | number of employees (size of business) |
| X | | other financial strength indicators |
| X | | length of time in business |
| X | | business structure (incorporated, "doing business as", LLC) |
| X | | type of business |
| X | | for other uninsured parties |
| X | | nonprofit agency |
| X | | fraternal |
| X | | government agency |
| X | | for tortfeasor's insurer |
| X | | financial strength |
| X | | resistance to pay characteristics |
| | X | common membership in alternative resolution pools |
| X | | type of insurance business |

To use this information, a table of base scores is established using an historic assessment of collection patterns for subrogation claims with the common attributes identified above. These represent the average recovery expectations for claims with similar attributes. This "average" base score is then fine tuned using the risk factors above to reflect the specific recovery expectations for each individual claim.

EXAMPLE 1

For simplicity, an example is now discussed in which there are only these attributes: (1) Type of underlying claim—automobile physical damage or workers compensation; Size of, Claim—$500 or $1,000; and, Type of Legally Liable Party —person or business. The base score table then would have 8 entries, each one reflecting the average historic expectations for the type of claims. Exemplary data is provided in Table-2.

TABLE 2

| CLAIM TYPE | CLAIM SIZE | PARTY TYPE | SCORE |
|---|---|---|---|
| AUTO PHYS DAMAGE | $ 500 | PERSON | 350 |
| AUTO PHYS DAMAGE | $1000 | PERSON | 750 |
| AUTO PHYS DAMAGE | $ 500 | BUSINESS | 400 |
| AUTO PHYS DAMAGE | $1000 | BUSINESS | 800 |
| WORKERS COMP | $ 500 | PERSON | 300 |
| WORKERS COMP | $1000 | PERSON | 600 |
| WORKERS COMP | $ 500 | BUSINESS | 350 |
| WORKERS COMP | $1000 | BUSINESS | 650 |

Supposing "Party A" and "Party B" each had separate car accidents with $500 worth of damage. According to a preferred form of the present invention, you start with a base score of 350 reflecting a 35% chance of loss recovery. The second step according to the present invention is to adjust the base for the set of claim specific risk factors Again for sake of explanation, it will be assumed there are only two: Statute of limitations—too late to take legal action or plenty of time, and Degree of negligence—other party either 100% or 50% to blame. These are independent conditions and, like all risk factors, are assessed separately. The final score becomes a product of the base score and all risk factors. For example, the Final score=base score×risk factor1×risk factor 2.

For the exemplary case the risk factors can be summarized as indicated in Table 3.

TABLE 3

| RISK FACTOR CLASS | SUBCLASS | RISK FACTOR |
|---|---|---|
| STATUTE OF LIMIT | Too late to take action | 0.0000 |
| STATUTE OF LIMIT | Plenty of time | 1.0000 |
| OTHER PARTY'S NEG | 100% | 500.0000 |
| OTHER PARTY'S NEG | 0.0% | 1.0000 |

Assuming Party B was totally to blame, but Party A's insurer took too long to pursue the case, the final score for Party A would be calculated as: Party A base score (350)× other party to blame (500)×too late for action (0.0000)=0.0000. This reflects a 0% chance of recovering losses after the statute of limitations has passed and there is no legal recourse, which is reasonable score for this case.

For a second example, assume Partys A and B are equally to blame and that there is plenty of time to file legal action. Party B's final score can be calculated as Party B base score (350)×other party 50% to blame (1.0000)×plenty of time (1.0000)=350. It should be noted there is nothing about this particular claim that would temper or override the base score. Thus, the factors correctly leave the base score unchanged. This final score reflects a 35% chance of recovering losses, average for this type of claim. Collections depend on the skill of the negotiators and willingness and ability of the other party to pay.

EXAMPLE 2

Table-4 summarizes information provided by a customer in a second example.

TABLE 4

| | |
|---|---|
| Type of Claim | Auto Collision |
| Accident Description | IV & OV collided in X |
| Claim Handler Negligence Assessment | None available |
| Accident State | California |
| Loss to be recovered | $1,250 |
| Deductible to be recovered | $250 |
| Type of insurance from which claim arose | Standard Personal Auto Policy |
| Age of Claim at time placed with subrogation unit | 65 days |
| Legal Action Started? Judgment Rendered? | No |
| Legally Liable Party | Person |
| Information Available to identify party | Name, address, phone |
| Insurance Status | Uninsured |
| Number of collection agencies working account | 1 |

This information can be supplemented by information about the legally liable party which can be obtained through automatically generated queries of commercially available databases for example. Table 5 summarizes exemplary information that can be obtained.

TABLE 5

| | |
|---|---|
| Gender | Male |
| Homeownership | Probable |
| Years at Current Address | 2 |
| Household Income | 45,000 |
| Age | 23 |

I. Subrogation Identification Screening Process

An analytical approach is used to screen for subrogation potential. It queries the information provided, assessing whether it has sufficient information to determine subrogation potential or additional information is required. It is dynamic with a learning—feedback mechanism, that continuously identifies new vocabulary and phrases. Once encountered, new phrases and related risk assessments are added to the utilized subrogation encyclopedia. Statutory rule changes are also made periodically. As an option, answers may be calibrated for specific customers.

More particularly, in a preferred embodiment the screening process can be summarized as follows:

Is this a 1st party claim which insurers typically have the right to subrogate? Yes. Standard Personal Auto contracts typically contain contractual language giving the insurer the right to recover payments made to indemnify the insured when someone else is legally liable for all or part of the damages.

Are there legal prohibitions against subrogation in the particular state of legal jurisdiction? There are none in California.

Is the claim closed or expected to close without payments? No. Recovery of $1,500 is being sought.

Have rights under the statute of limitation been preserved? Is there time to bring legal action? The loss event occurred 65 days ago, leaving plenty of time to begin legal action within the statute of limitation.

Does the accident description of other information provided show someone else might be liable for all or part of the loss? Yes. We are interpreting "IV & OV collided in X" to mean the insured vehicle and another vehicle collided in an intersection. The assessment is that negligence is shared, probably 50%/50% between the insured and the other party.

Does the state bar recovery based on the insured's degree of negligence? No. California is a "pure" comparative negligence state. Insurer would be entitled to 50% recovery based on a shared 50% negligence.

Is there enough information to identify and locate the alleged legally liable party? There appears to be. Full name address and phone number were provided.

Using convention business logic, this analysis leads to a conclusion there is "DEFINITE SUBROGATION POTENTIAL" and that a "SUBROGATION RECOVERY POTENTIAL CAN BE SCORED" for example.

II. Calculation of a Subrogation Collection Score

A mathematical approach to calculate a score is used. This process is also dynamic, incorporating a feedback loop. Actual results are compared with statistical expectations for benchmark books at various points in time. Whenever a pattern develops where the scores vary beyond statistical expectations, the scores are recalibrated. In a preferred embodiment, the analytical algorithm is as follows:

For every claim $X_{IAB}$, the COLLECTION SCORE $(X_{IAB}, Y_I) = 10,000 \ E(P_I R_I N_{IA} O_{IB}) \ IIY_{IM}$, where $P_I$=Probability of a legally Liable Party with Characteristics I Making Any Payment $R_I$=Probable Percentage of Losses Recovered from parties who Make Any Payment $N_{IA}$=Adjustment Reflecting the Difference in Expected Recoveries from Base Expectations Under Economic Scenario A $Q_{IB}$=Adjustment Reflecting the Difference in Expected Recoveries from Base Expectations Under Operational Scenario B; and, $Y_{IM}$=Risk Factors associated with characteristics of the claim.

Let I be the claim presented above where we are seeking recovery of $1,500 arising from a California personal auto collision claim, examined 65 days after the accident. We are subrogating against an uninsured individual for an accident described as "IV & OV collided in X". The complete name and address is provided for the driver of the other vehicle. This is the $1^{st}$ agency trying to recover the money.

STEP 1. Calculate $P_I$, the Probability of a Legally Liable Party Making a Payment.

$P_I = P(ij)$ where the "i" factor reflects a personal lines collision claim with an uninsured individual as legally liable party. The "j" factor reflects characteristics of the claim and legally liable party.

For auto collision, $P_I$ takes the form of $\alpha_{01} + \alpha_{11}[e^\theta/(1+e^\theta)]$ $$\theta = 1n(p_{ij}/(1+p_{ij})) = \sigma_{0i} + \sigma_{1ij}(0,1) + \sigma_{2ij}(0,1) + \sigma_{3ij}(0,1) + \sigma_{4ij}(0,1) + \sigma_{5ij}(0,1) + \sigma_{6ij}(0,1) + \sigma_{7ij}(0,1) + \sigma_{8ij}(0,1)$$

For this claim i . . .

$\sigma_0$ is the logistic regression constant.
$\sigma_{0i} = 0.829$
$\sigma_{1ij}(0,1)$ refers to the size of claim.

$$\sigma_{1i(\$1,001-2,000)}(0,1) = 1.009*0 + .2570*0 - .019*1 - .038*0 -$$
$$.1620*0 - .2860*0 - .2860*0 - .2855*$$
$$0 - .285*0 - .2845*0 - .284*0$$
$$= -0.019$$

$\sigma_{2ij}(0,1)$ refers to the age of claim.

$$\sigma_{2i(61-90 \ days)}(0,1) = -1.214*0 - 1.4540*1 - 2.018*0 -$$
$$2.4110*0 - 2.678*0 - 2.247*0 - 1.851*$$
$$0 + -1.846*0$$
$$= -1.454$$

$\sigma_{3ij}(0,1)$ refers to the accident state negligence laws.

$$\sigma_{3i(comparitive \ negligence)}(0,1) = 1.3055*0 - .04*1 - .2365*0 -$$
$$.2365*0 - 1.3055*0 - 1.99*0 -$$
$$.8523*0$$
$$= -.04$$

$\sigma_{4ij}(0,1)$ refers to the age of the legally liable party.

$$\sigma_{4i(19-35 \ years \ old)}(0,1) = .472*1 - .38*0 - .722*0 - .832*$$
$$0 - 0.3655*0 + 0.472*0$$
$$= .472$$

$\sigma_{5ij}(0,1)$ refers to household income.

$$\sigma_{5i(\$35,000-49,999)}(0,1) = -1.3055*0 - .04*1 - .2365*0 - .2365*$$
$$0 - 1.3055*0 - 1.99*0 - 0.8523*0$$
$$= -.04$$

$\sigma_{6ij}(0,1)$ refers to gender.

$$\sigma_{6i(male)}(0,1) = -.45*0 - .62*1 - .0*0 - .86*0$$
$$= -.62$$

$\sigma_{7ij}(0,1)$ refers to homeownership.

$$\sigma_{7i(probable \ homeowner)}(0,1) = -.171*1 - .231*0$$
$$= -.171$$

$\sigma_{8ij}(0,1)$ refers to the number of years at the current address.

$$\sigma_{8i(1-3 \ years)}(0,1) = .239*0 + .778*1 + 1.546*0 + 4.783*$$
$$0 + 1.3736*0$$
$$= .778$$

For this claim,
$\theta = 0.829 - 0.019 - 1.454"0.04 + 0.474 - 0.04 - 0.62 - 0.171 + 0.778$ $e^{74} = 0.76874$ It should be noted there were no calibration adjustments for this claim
$\alpha_{0I}$, the additive calibration factor=0
$\alpha_{1I}$, the multiplicative calibration factor=1

Putting the pieces together, the probability of the legally liable party for this claim making a payment, the expected value.

$$E(P_I) = \alpha_{0I} + \alpha_{1I}[e^\theta/(1+e^\theta)]$$
$$= 0 + 1(.76874/(1+.76874)$$
$$= 43.46\%$$

STEP 2. Next, calculate $R_I$=the Probable Percentage of Losses Recovered from Parties who Make Any Payment.

I=R(ij). The "i" factor reflects a personal lines collision claim with an uninsured individual as legally liable party, the "j" factor reflects the size of claim ($1,001-$2,000).

or this claim, The expected value, E(R(I, $1,001-$2,000))=0.7485

STEP 3. Through $N_{IA}$, factor in any adjustments needed for differences from the baseline due to changes in economic conditions.

$N_{IA}$=N(i,a)=1+E($v_{ia}$). The "i" factor reflects a personal lines collision claim with an uninsured individual as legally liable party. The "a" factor reflects the economic environment of the legally liable party's residence in California, plus countywide inflation factors and changes in the leading economic indications.

For this claim, the expected value $E(N_{IA})$= 1+(0.026)=1.026

STEP 4. $O_{IB}$=adjusts for differences from the baseline due to differences in operation strategies or efficiencies.

$O_{IB}$=O(i,b)=1+E($O_{ib}$). The "i" factor reflects a personal lines collision claim with an uninsured individual as legally liable party, the "b" factor reflects known differences in collection strategies that would impact these types of recoveries.

For this claim we have factored in no differences from our benchmark.

The expected value E($O_{ib}$)=1 +(0.0)=1.000.

In STEP 5 we can now put together the major piece of our equation. For this claim, $E(P_I R_I N_{IA} O_{IB})$=43.46%×0.7485 X (1.026)×1.000=33.38% This is the expected recovery rate for this type of claim.

IN STEP 6, through $Y_{IM}$ specific risk factors associated with the circumstances of the claim are brought in.

$m_{i1}$, modifies recovery expectations due to limitations of legal process arising from any statutes of limitations or other state prohibitions. For this claim, $m_{i1}$=1.0000. Working within the statue of limitations should not present a problem and there are no state issues.

$m_{i2}$, modifies recovery expectations due to state recovery limitations based on the insureds culpability. For this claim, the insured and other driver were assessed as both 50% at fault. This is the average expectation in our baseline and no adjustments were made. Here $m_{i2}$=1.0000.

$m_{i3}$, modifies expectations if other agencies have attempted and failed to recover for the claim. Since this is indicated to be the 1st subrogation placement, no modifications were made. $m_{i3}$=1.0000

$m_{i4}$, modifies expectations due to difficulty in identifying or locating a legally liable party. Since sufficient information appears to be available, no adjustments were needed. $m_{i4}$=1.0000.

For this claim $\Pi Y_{IM}$=1.000×1.000×1.000×1.000=1.000

STEP 7 completes the calculations for this claim

The COLLECTION SCORE $(X_{IAB}, Y_I)$=10,000 $E(P_I R_I N_{IA} O_{IB})$ $\Pi Y_{IM}$=10,000×33.38%×1.000=3,338

III. Calculation of a Netback Score

The netback score is a sister of the collection score, building on its mathematical algorithms. It differs in two areas.
1. Recovery potential is quantified at the end of specific period(s) of time working the debt.
2. Collection expense is factored in.

The calculation is illustrated using the same example, incorporating two additional pieces of information. We are interested in the score based on 18 months of collections and factor in a 20% contingent collection fee.

The analytical algorithm, for every claim $X_{IAB}$, can preferably be characterized as follows:

SUBROGATION NETBACK SCORE $(X_{IAB}, Y_I)$=LIQUIDATION SCORE $(X_{IAB t}, Y_{It})$-EXPENSE SCORE $(X_{IAB t}, Y_{It})$

STEP 1—LIQUIDATION SCORE: The mathematical algorithms for the liquidation and subrogation score are identical. The difference is that parameter values selected reflect the time series points. Without repeating the details, for our example:

$$\text{LIQUIDATION SCORE } (X_{IAB(18months)}, Y_I)$$
$$= 10{,}000 E[P_{I(18\,months)} R_{I(18\,months)} N_{IA(18\,months)} O_{IB(18\,months)}] \Pi Y_{IM}$$
$$= 10{,}000\ X\ 29.8\%\ X\ 1.000$$
$$= 2{,}980$$

Note, that the lower score reflects the omission of :collections made after 18 months.

STEP 2—EXPENSE SCORE: The expense score factors into the equation collection costs through time frames corresponding to the companion liquidation score.

EXPENSE SCORE $(X_{IAB t}, Y_{It})$=10,000 $E(U_{IBt} O_{IBt})$

Where $U_{IBt}$=Cost of Collection under Operational Scenario B through time t

For our example, cost is a function of the liquidation score $$U_{Ib(18\,months)} = \Gamma\{E[P_{I(18mo)} R_{I(18mo)} N_{IA(18mo)} O_{IB(18mo)}] \Pi Y_{IM}\}$$
$$= 20\% E[P_{I(18\,months)} R_{I(18\,months)} N_{IA(18\,months)} O_{IB(18\,months)}] \Pi Y_{IM}$$
$$= 20\% X 29.8\%$$
$$= 5.98\%$$

$O_{IBt}$=is a calibration factor used to adjust the cost estimates to current.

None was needed for our example and the baseline factor is 1.000.

Putting the pieces together for our example.

EXPENSE SCORE $(X_{IABt}, Y_{It})$ = 10,000 $E(U_{IBt} O_{IBt})$
$$= 10{,}000\ X\ U_{Ibt} X\ U_{Ibt}$$
$$= 10{,}000 X 5.98\% X 1.000 = 596$$

STEP 3—Completing the calculations:

NETBACK SCORE = LIQUIDATIONSCORE $(X_{IABt}, Y_{It})$ −

EXPENSE SCORE $(X_{IABt}, Y_{It})$ $$= 2{,}980 - 596 = 2{,}384$$

IV. Calculations of a Net Liquidation Score

The NET LIQUIDATION SCORE is the discount value of the NetBack Score where accounts are worked to ultimate completion. Mathematically, for every claim $X_{IAB}$, SUBROGATION NET LIQUIDATION SCORE $(X_{IAB}, Y_l)$ =

10,000 present value [.0001 $X$ LIQUIDATION SCORE $(X_{IAB}, Y_l)$ −

.0001$X$ EXPENSE SCORE $(X_{IAB}, Y_l)$

For our example above calculations for the liquidation score and expense score are identical to those already explained. To complete the score:

NET LIQUIDATION SCORE $(X_{IAB}, Y_l)$ = 10, 000 $X$ present value

[.0001$X3NullNull$338 − .0001$X$668] = 10,000 $X$ present value (26.7%)

= 10,000 $X$ 23.3% = 2,332

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. A computer-implemented method for identifying select ones of insurance records which possess a favorable subrogation potential for an insurer, the method comprising:
   receiving by a processor data indicative of a plurality of insurance claims as to which the insurer has a right of subrogation, the data including, for each insurance claim, a type of insurance claim, a size of the insurance claim, a type of responsible person, and whether the policy under which the claim is made is a personal or business policy;
   calculating by the processor a base score for each of the claims indicative of likelihood of expected subrogation recovery dependently upon the received data, the calculating of the base score employing attributes including: the type of insurance claim, the insurance claim type values comprising automobile physical damage, automobile collision, and workers compensation, the size range of an underlying insurance claim, and a type of responsible person, the responsible person type values comprising individual or business;
   receiving by the processor risk factors for each of the claims, including whether a policy under which each claim was made is a personal or a business insurance policy, degree of insured's and tortfeasor's culpability for subrogation recovery, reduced collection potential evidenced by failure of other collection agencies to recover, and limitations due to difficulty in identifying and/or locating tortfeasor; and,
   scoring by the processor each of the claims dependently upon the base scores and received risk factors to provide a value indicative of an expected subrogation recovery, the value not representing a sum certain of an obligation to the insurer, and storing the value by the processor in a memory.

2. The method of claim 1, further comprising providing by the processor recovery strategy recommendation and recovery specialist checklists to optimize steps taken to recovery losses at minimum expense.

3. The method of claim 1, wherein the receiving the data comprises:
   receiving the data in electronic form.

4. The method of claim 1, wherein the receiving the data comprises:
   providing a user interface; and, extracting the data from the user interface.

5. The method of claim 1, wherein the calculating the base score comprises calculating a likelihood a payment will be made by a responsible party.

6. The method of claim 5, wherein the calculating a base score further comprises calculating a probable percentage of losses recovered through payments received from said responsible party.

7. The method of claim 6, wherein the calculating a base score further comprises: identifying at least one economic factor pertinent to said base score;
   and, calculating a first adjustment dependently upon said identified at least one economic factor.

8. The method of claim 7, wherein the calculating a base score further comprises: identifying at least one collection efficiency or strategy pertinent to said base score; and, calculating a second adjustment dependently upon said identified at least one collection efficiency or strategy.

9. The method of claim 8, wherein the calculating a base score further comprises calculating said base score using said calculated likelihood a payment will be made, calculated probable percentage of losses recovered, calculated first adjustment and calculated second adjustment.

10. The method of claim 1, wherein said risk factors are identified using additional data from at least one external database.

11. The method of claim 1, wherein said risk factors address recovery expectations due to time limitations.

12. The method of claim 1, wherein said risk factors address recovery expectations due to recovery limitations based on a degree of fault assessed to said responsible party.

13. The method of claim 1, wherein said risk factors address if other agencies have attempted and failed to recover on the claim, and said agencies are selected to include attorneys, inhouse efforts or outside agents.

14. The method of claim 1, wherein said risk factors address expected difficulties in locating said responsible party.

15. The method of claim 1, wherein said risk factors address issues selected from the group consisting of: expectations due to time limitations, recovery expectations due to recovery limitations based on a degree of fault assessed to said responsible party, if other agencies have attempted and failed to recover on the claim, and expected difficulties in locating said responsible party.

16. The method of claim 1, further comprising quantifying said value indicative of an expected subrogation recovery at specific periods of time.

17. The method of claim 16, wherein said quantified values factor in expected collection expenses.

18. The method of claim 16, wherein said quantifying at specific periods of time comprises: calculating a liquidation value for said claim for each specified period of time; calculating an expected expense value for said claim for each specified period of time; and, calculating an quantified value for each specified period of time using said calculated liquidation and expected expense values.

19. The method of claim 18, further comprising discounting said quantified values to provide net liquidation values for each specified time period.

20. The method of claim 1, wherein the calculating said base score comprises: automatically calculating an expected probability a responsible party will make a payment; automatically calculating an expected probable percentage of losses recovered through payments received from responsible parties; and, automatically adjusting resultant scores for differences due to economic conditions or operation strategies or efficiencies.

21. A computerized system for identifying select ones of insurance records which possess a favorable subrogation potential, the system comprising: at least one computing device for receiving data indicative of a plurality of insurance claims as to which an insurer has a right to subrogation; and, a computer readable medium being accessible to said computing device, said computer readable medium comprising: a sequence of directions for automatically calculating a base score for the claims indicative of a probability of expected subrogation recovery dependently upon the received data using said at least one computing device, the calculating of the base score employing attributes including a type of underlying insurance claim the insurance claim type values comprising automobile physical damage, automobile collision, and workers compensation, a size of an underlying insurance claim, and a type of responsible party, the responsible person type values comprising individual or business; a sequence of directions for automatically identifying risk factors, including whether a policy under which each claim was made is a personal or a business insurance policy, degree of insured's and tortfeasor's culpability for subrogation recovery, reduced collection potential evidenced by failure of other collection agencies to recover, and limitations due to difficulty in identifying and/or locating tortfeasor, for each of the claims using said at least one computing device; and, a sequence of directions for automatically scoring each of the claims dependently upon the base scores and identified risk factors to provide a value indicative of an expected subrogation recovery, the value not representing a sum certain of an obligation to the insurer, using said at least one computing device.

* * * * *